(12) United States Patent
Paik et al.

(10) Patent No.: US 10,476,100 B2
(45) Date of Patent: Nov. 12, 2019

(54) LITHIUM-CONTAINING ELECTRODE MATERIAL FOR ELECTROCHEMICAL CELL SYSTEMS

(75) Inventors: Chi Paik, Brownstown Township, MI (US); Robert J. Kudla, Canton, MI (US); Andrew Robert Drews, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 999 days.

(21) Appl. No.: 12/896,976

(22) Filed: Oct. 4, 2010

(65) Prior Publication Data

US 2011/0143204 A1    Jun. 16, 2011

(51) Int. Cl.
*H01M 4/525* (2010.01)
*H01M 10/0525* (2010.01)

(52) U.S. Cl.
CPC .............................. *H01M 10/0525* (2013.01)

(58) Field of Classification Search
CPC .... H01M 4/505; H01M 4/0416; H01M 4/139; H01M 4/62; H01M 4/1391; H01M 4/131; H01M 4/525; H01M 4/48; H01M 4/50; H01M 4/52; H01M 10/0567; H01M 10/7011; C01G 53/006; C01G 53/42; C01G 53/50; C01G 51/006; C01G 51/42; C01G 45/006; C01P 2002/77; C01P 2002/74; C01P 2002/54; C01P 2002/85; C01P 2006/11; C01P 2006/80; C01P 2006/12; C01P 2004/64; C01P 2004/32; C01P 2004/04; C01P 2004/62; Y02E 60/122

(Continued)

(56) References Cited

U.S. PATENT DOCUMENTS

| | | | | |
|---|---|---|---|---|
| 6,017,654 | A | * | 1/2000 | Kumta et al. ............ 429/231.95 |
| 6,045,771 | A | * | 4/2000 | Matsubara et al. ........ 423/594.4 |

(Continued)

FOREIGN PATENT DOCUMENTS

| | | | | | |
|---|---|---|---|---|---|
| JP | 08236114 | A | * | 9/1996 | ............ H01M 4/58 |
| JP | 2003017052 | A | * | 1/2003 | ............ H01M 4/58 |

OTHER PUBLICATIONS

Machine Translation and Abstract in English of JP 2003-017052.*

(Continued)

*Primary Examiner* — Haroon S. Sheikh
(74) *Attorney, Agent, or Firm* — Geoffrey Brumbaugh; Brooks Kushman P.C.

(57) ABSTRACT

An electrode material is provided to include a Li-containing oxide of the formula of $Li(Ni_xCo_yM_z)O_2$, wherein M is an element different from Li, Ni, Co, or O, wherein x, y, and z are each independently between 0 and 1 and the sum of x, y, z is 1; and an oxygen scavenger material contacting at least a portion of the Li-containing oxide. In another embodiment, the electrode material further includes a second Li-containing oxide having the formula of $Li(Ni_{x2}Co_{y2}M_{z2})O_2$, wherein M is an element different from Li, Ni, Co, or O, wherein x2, y2, and z2 are each independently between 0 and 1 and the sum of x2, y2, z2 is 1, wherein the oxide composite is configured as a first material layer, wherein the second Li-containing oxide is configured as a second material layer disposed next to the first material layer.

20 Claims, 6 Drawing Sheets

(58) Field of Classification Search
USPC ..... 429/231.5, 234.95, 223–224, 218.1, 209, 429/246, 200; 423/594.4–594.6, 423/599–600; 313/346 R; 252/182.1
See application file for complete search history.

(56) References Cited

U.S. PATENT DOCUMENTS

| | | | |
|---|---|---|---|
| 7,018,607 B2 | 3/2006 | Nazri et al. | |
| 7,316,792 B2 | 1/2008 | Kosuzu et al. | |
| 7,468,223 B2 | 12/2008 | Thackeray et al. | |
| 7,579,112 B2 | 8/2009 | Chiang et al. | |
| 2001/0012591 A1* | 8/2001 | Michot et al. | 429/339 |
| 2004/0058243 A1* | 3/2004 | Ohzuku et al. | 429/231.1 |
| 2004/0160157 A1* | 8/2004 | Takikawa et al. | 313/346 R |
| 2004/0191633 A1* | 9/2004 | Johnson | H01M 4/131 |
| | | | 429/246 |
| 2005/0130042 A1* | 6/2005 | Liu | C01G 45/1242 |
| | | | 429/231.3 |
| 2005/0266316 A1* | 12/2005 | Kitao et al. | 429/246 |
| 2006/0024584 A1* | 2/2006 | Kim et al. | 429/326 |
| 2006/0068293 A1 | 3/2006 | Kim et al. | |
| 2008/0008933 A1* | 1/2008 | Lampe-Onnerud | 429/156 |
| 2008/0318131 A1* | 12/2008 | Watanabe | C01G 51/42 |
| | | | 429/231.95 |
| 2009/0181296 A1 | 7/2009 | Lampe-Onnerud et al. | |
| 2009/0200510 A1* | 8/2009 | Watanabe | H01M 4/131 |
| | | | 252/182.1 |
| 2009/0233176 A1* | 9/2009 | Kita et al. | 429/231.95 |
| 2009/0263707 A1 | 10/2009 | Buckley et al. | |
| 2009/0286157 A1* | 11/2009 | Chen et al. | 429/209 |
| 2009/0291365 A1 | 11/2009 | Iacovangelo et al. | |
| 2011/0168550 A1* | 7/2011 | Wang | H01M 4/13 |
| | | | 204/290.12 |
| 2011/0260099 A1* | 10/2011 | Paulsen et al. | 252/182.1 |

OTHER PUBLICATIONS

Dictionary.com, LLC, (2009; http://dictionary.reference.com/browse/intermix).*
Machine Translation and Abstract in English of JP 08-236114.*
Ding et al. Effect of rare earth elements doping on structure and electrochemical properties of $LiNi_{1/3}Co_{1/3}Mn_{1/3}O_2$ for lithium-ion battery. May 2007. Solid State Ionics. v. 178, issues 13-14. pp. 967-971.*

* cited by examiner

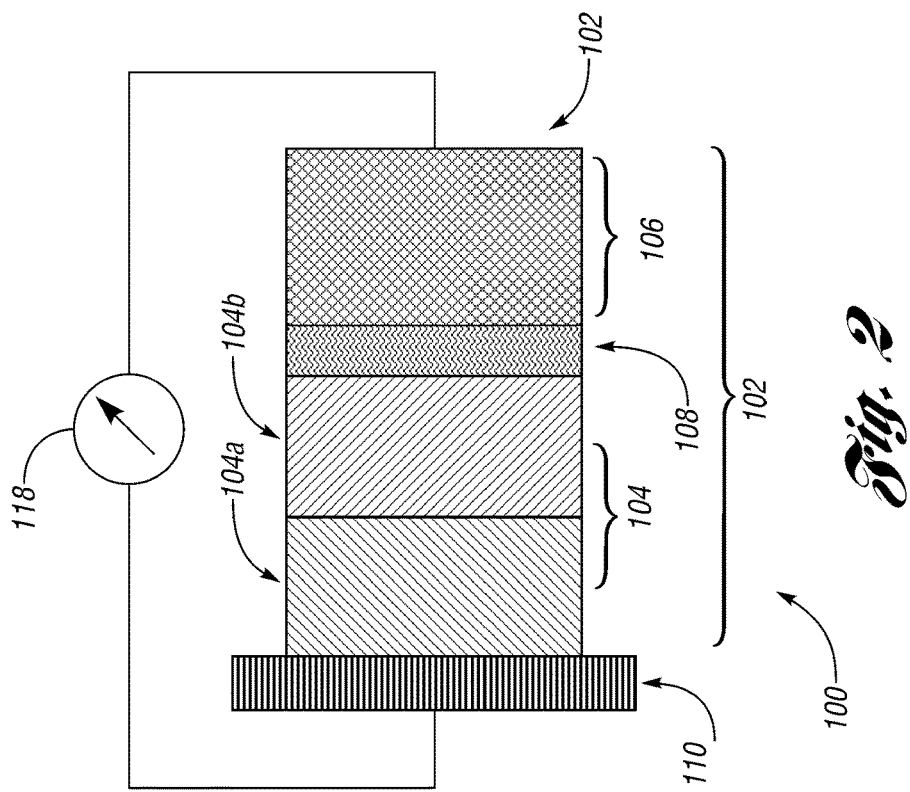
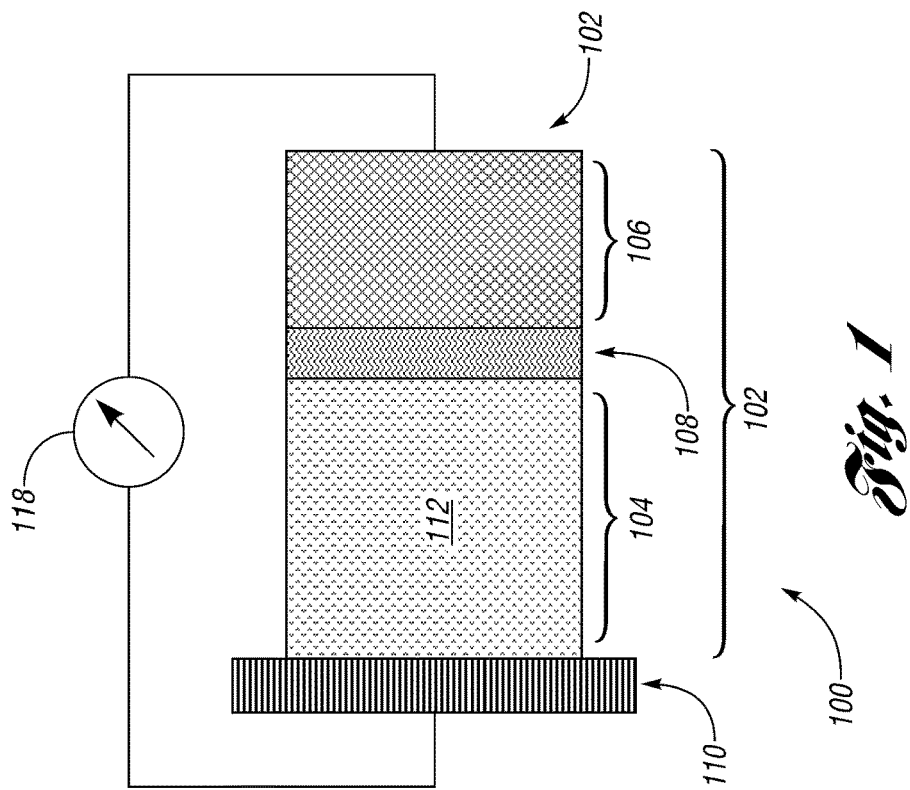

LITHIUM-CONTAINING ELECTRODE MATERIAL FOR ELECTROCHEMICAL CELL SYSTEMS

BACKGROUND

1. Technical Field

One or more embodiments of the present invention relate to lithium-containing electrode materials and electrochemical cell systems employing the same.

2. Background Art

Electrochemical cells such as lithium ion batteries have a range of uses in, for instance, mobile communication devices such as phones, mobile entertainment devices such as MP3 players and televisions, portable computers, as well as transportation devices such as automobiles and forklifts.

The implementation of lithium ion batteries has been met with certain limitations. For instance, cathode materials of the lithium ion batteries are often subject to oxygen-mediated thermal decomposition or thermal runaway. During a thermal runaway process, cathode oxides can decompose and release oxygen to react with other organic solvents and vapors heated by internal resistance. As a result, the cathode material becomes less stable at certain conditions. In addition, repeated charging may also lead to decay in performance.

SUMMARY

According to one aspect of the present invention, an electrode material is provided. In one embodiment, the electrode material includes a Li-containing oxide of the formula of $Li(Ni_xCo_yM_z)O_2$, wherein M is an element different from Li, Ni, Co, or O, wherein x, y, and z are each independently between 0 and 1 and the sum of x, y, z is 1; and an oxygen scavenger material contacting at least a portion of the Li-containing oxide.

In another embodiment, the oxygen scavenger material is selected from the group consisting of $ZrO_2$, $Y_2O_3$, $CeO_2$, $TiO_2$, $Al_2O_3$, and combinations thereof.

In yet another embodiment, M is selected from the group consisting of Al, Mn, Cr, Fe, and combinations thereof. In yet another embodiment, y is between 0 and 1/3. In yet another embodiment, at least one of x and z is no less than 1/3.

In yet another embodiment, the Li-containing oxide is selected from the group consisting of $Li(Ni_xCo_yAl_z)O_2$, $Li(Ni_xCo_yMn_z)O_2$, $Li(Ni_xCo_yAl_{za}Mn_{zb})O_2$, and combinations thereof, wherein za and zb are each a non-zero value and the sum of za and zb equals z.

In yet another embodiment, the Li-containing oxide further includes a dopant. In certain instances, the dopant is selected from the group consisting of Cr, Zr, Sr, Y, La, Mg, Ce, Pr, V, and combinations thereof.

In yet another embodiment, a molar ratio between the dopant relative to the Li-containing oxide is from 0.001 to 0.1.

In yet another embodiment, the electrode material further includes a second Li-containing oxide having the formula of $Li(Ni_{x2}Co_{y2}Mz_2)O_2$, wherein M is an element different from Li, Ni, Co, or O, wherein x2, y2, and z2 are each independently between 0 and 1 and the sum of x2, y2, z2 is 1, wherein the oxide composite is configured as a first material layer, wherein the second Li-containing oxide is configured as a second material layer disposed next to the first material layer.

According to another aspect of the present invention, an electrochemical cell system is provided. In one embodiment, the electrochemical cell system includes a cathode material including a first material layer and a second material layer disposed next to the first material layer, the first and the second material layers each independently including a Li-containing oxide of the formula of $Li(Ni_xCo_yMz)O_2$, wherein M is an element different from Li, Ni, Co, or O, wherein x, y, and z are each independently between 0 and 1 and the sum of x, y, z is 1; and a current collector in electronic communication with the cathode material. In another embodiment, the first material layer further includes a dopant, and is disposed between the second material layer and the current collector.

BRIEF DESCRIPTION OF THE DRAWINGS

FIG. 1 depicts an electrochemical cell system according to one embodiment of the present invention;

FIG. 2 depicts an electrochemical cell system according to another embodiment of the present invention;

DETAILED DESCRIPTION

Figure 3:
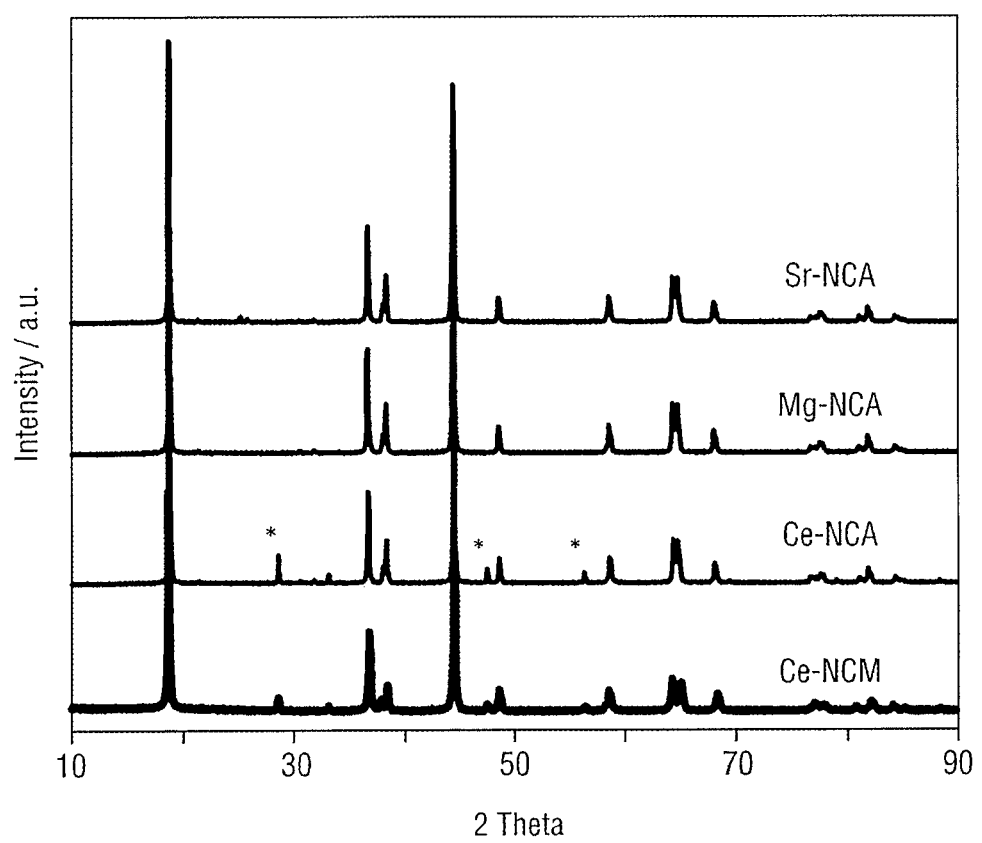
FIG. 3 depicts X-ray diffraction (XRD) patterns of Ce-NCM ($LiNi_{0.33}Co_{0.33}Mn_{0.33}O_2$), Ce-NCA ($LiNi_{0.8}Co_{0.15}Al_{0.05}O_2$), Mg-NCA, and Sr-NCA, according to one or more embodiments of the present invention.

As required, detailed embodiments of the present invention are disclosed herein. However, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or a representative basis for teaching one skilled in the art to variously employ the present invention.

Moreover, except where otherwise expressly indicated, all numerical quantities in this description and in the claims indicating amounts of materials or conditions of reactions and/or use are to be understood as modified by the word "about" in describing the broadest scope of this invention. Practice within the numeral limit stated is generally preferred. Also, unless expressly stated to the contrary, percent, "parts of", and ratio values are by weight and the description of a group or class of materials are suitable or preferred for a given purpose in connection with the invention implies that mixtures of any two or more members of the group or class may be equally suitable or preferred.

Lithium-containing electrode materials, described herein according to one or more embodiments of the present invention, can be used in any suitable electrochemical cell system including any primary and secondary batteries known in the art. However, for the purpose of mere illustration, the lithium-containing electrode materials will be described within the context of lithium ion batteries.

A lithium ion battery is a type of rechargeable battery in which lithium ions move from the anode to the cathode during discharging and from the cathode to the anode during charging. During discharging, the current flowing within the battery is carried by the movement of lithium ions from the anode to the cathode. During charging, an external electrical power source, such as a charging circuit, forces the current to pass in the reverse direction, wherein the lithium ions migrate from the cathode to the anode, where they become embedded in the anode material in a process known as intercalation. Lithium ion batteries refer to batteries in which the anode material is also a lithium intercalation material. If lithium metal itself is used as the anode material or the negative electroactive material, the resulting battery generally is simply referred to as a lithium battery.

According to one aspect of the present invention, an electrochemical cell system is provided. In one embodiment, and as depicted in FIG. 1 and/or FIG. 2, the electrochemical cell system generally shown at 100 includes an electrochemical cell 102 such as a lithium ion battery, the electrochemical cell 102 including a cathode 104 and an anode 106. In certain instances, the electrochemical cell system may further include a current collector 110 in electronic communication with the cathode 104. In certain other instances, the electrochemical cell system may further include a separator 108 separating the cathode 104 and the anode 106. It is appreciated that in certain particular instances, the separator 108 may not be needed. As further depicted in FIG. 1 or FIG. 2, an external load 118 can be applied to complete the electronic cycle.

When used, the separator 108 can include any film-like material having been generally used for forming separators of secondary batteries of this type, for example, a microporous polymer film made from polypropylene, polyethylene, or a layered combination of the two. In addition, if a solid electrolyte or gel electrolyte is used as the electrolyte, the separator 108 does not necessarily need to be provided. A microporous separator made of glass fiber or cellulose material can in certain cases also be used.

In another embodiment, and as depicted in FIG. 1, the cathode 104 includes a cathode material 112. The cathode material includes a Li-containing oxide of the formula of $Li(Ni_xCo_yM_z)O_2$, wherein M is an element different from Li, Ni, Co, or O, wherein x, y, and z represent respective molar ratios and are each independently between 0 and 1, and the sum of x, y, z is 1; and an oxygen scavenger material contacting at least a portion of the Li-containing oxide.

Compared to other cathode materials for Li ion batteries, the Li-containing oxide of the formula of $Li(Ni_xCo_yM_z)O_2$ described herein is believed to be less costly, lighter in weight, and provide higher energy power. In a particular instance wherein the Li-containing oxide is provided with a molar ratio of Co being less than one third (⅓), the relatively expensive material Co can be effectively reduced in amount, optionally with the use of the oxygen scavenger material as will be detailed below.

Without being limited to any particular theory, it is appreciated that the oxygen scavenger material helps absorb oxygen species released during an unwanted thermal runaway and therefore relieves the possibility of battery malfunction or explosion. Without being limited to any particular theory, it is further appreciated that the oxygen scavenger material may have the additional function of providing anti-corrosion protection over the Li-containing oxide against the very acid and corrosive battery environment. Non-limiting examples of oxygen scavenger materials include $ZrO_2$, $Y_2O_3$, $CeO_2$, $CeO$, $TiO_2$, $Al_2O_3$, and combinations thereof.

In another embodiment, the Li-containing oxide further includes a dopant. In certain instances, the dopant is intermixed with the Li-containing oxide to form an oxide composite. Without being limited to any particular theory, the dopant is believed to replace and occupy one or more sites of one or more Ni, Co, and M in a crystal structure of the Li-containing oxide of $Li(Ni_xCo_yM_z)O_2$. In certain instances, the dopant is not intended to replace lithium, while replacing Ni, Co, and/or M. In this arrangement, and particularly when the dopant is a multivalent element such as Y or Ce, the substitution is believed to provide the cathode material with multiple oxidation states, and hence with lower structural distortions. In an alternative arrangement, the substitution coupled with the coating as described in more detail herein elsewhere, helps render the highly specific $Li(Ni_xCo_yM_z)O_2$ less susceptible to side reaction and hence safer.

In yet another embodiment, M is selected from the group consisting of Al, Mn, Cr, Fe, and combinations thereof. In yet another embodiment, y is smaller than x. In certain instances, y is between 0 and ⅓, in certain other instances, at least one of x and z is no less than ⅓.

In yet another embodiment, the Li-containing oxide is selected from the group consisting of $Li(Ni_xCo_yAl_z)O_2$, $Li(Ni_xCo_yMn_z)O_2$, $Li(Ni_xCo_yAl_{za}Mn_{zb})O_2$, and combinations thereof, wherein za and zb are each a non-zero value and the sum of za and zb equals z.

In yet another embodiment, the dopant is selected from the group consisting of one or more transitional metals, one or more alkaline earth metals, one or more rare earth metals, and combinations thereof. In certain instances, the dopant is selected from the group consisting of Cr, Zr, Sr, Y, La, Mg, Ce, Al, Pr, V, and combinations thereof.

In yet another embodiment, a molar ratio between the dopant relative to the Li-containing oxide is from 0.001 to 0.1, 0.005 to 0.08, or 0.01 to 0.06.

In yet another embodiment, and as depicted in FIG. 2, the cathode 104 is configured to include a first layer 104a and a second layer 104b, each independently including a Li-containing oxide of the formula of $Li(Ni_xCo_yM_z)O_2$ as described herein. It is appreciated that the cathode material 112 is not limited to have two layers and can be formed of any suitable number of layers. In certain instances, at least one of x, y, and z is different between the first and the second layers 104a, 104b. In certain other instances, the first layer 104a further includes a dopant and/or is in contact with an oxygen scavenger material with the latter forming at least a partial coating on the Li-containing oxide. The doped and/or coated first layer 104a of the cathode material 112 can be disposed next to the current collector 110 to tolerate relatively high operational current or voltage. In this arrangement, the second layer 104b or more layers can be disposed more away from the current collector 110. Without being limited to any particular theory, it is believed that this arrangement of layering places more robust material at more aggressive regions of the cathode 104, such as the regions relatively closer to the current collector 110.

In one or more embodiments, the cathode material 112 may be prepared using any suitable methods. In one exemplified method, a concentrated liquid mixture is formed from suitable hydrated salts of lithium, nickel, cobalt, and element M, plus hydrated salts of the dopant. In certain instances, crystalline nitrate salts of these elements with water molecules in the crystals are utilized. Mixtures of these crystalline salts can be heated to form a liquid at certain temperatures. The liquid provides a medium for a uniform mixture of the elements that are to be incorporated into the cathode material. The liquid is like a concentrated solution and contains a minimal amount of water for relatively efficient desiccation to an anhydrous powder. Then upon heating in air the nitrate anions in the powder release nitrogen oxides to leave a residue of the lithium, nickel and doping elements in a crystalline oxide suitable for use as active cathode material in a lithium secondary battery. While hydrated nitrate salts may be used because of their availability and effectiveness in the process of embodiments of the present invention, other acidic salts may be used, particularly inorganic acid salts, such as nitrite salts, having good water solubility.

In certain instances, an aqueous liquid, possibly a concentrated aqueous solution, is formed containing the nitrate salts of lithium and nickel plus the nitrate salts of elements such as cobalt, aluminum and magnesium. The water for the solution is derived from the water molecules of crystallization present in the solid hydrated nitrate salts of the metals selected for incorporation in the cathode material. Crystalline lithium nitrate is available with one water of crystallization ($LiNO_3.H_2O$) or lithium nitrate may be used in its anhydrous form. The nitrates of nickel, cobalt, aluminum and magnesium, for example, are commercially available as $Ni(NO_3)_2 6H_2O$, $Co(NO_3)_2 6H_2O$, $Al(NO_3)_3 9H_2O$, and $Mg(NO_3)_2 6H_2O$. Most of the elements that might be desired as dopants in the lithium nickel oxide cathode material are available in the form of their hydrated nitrate salts and can be used in that form in the practice of this invention. In one example, Ti can be suitably added as $TiO_2$ as will be illustrated. $TiO_2$ (anatase) powders can be intermixed into the cathode material slurry.

The synthesis of the cathode material 112 can be deposited using a solution-based precipitation approach. A powder of the cathode material is mixed in a suitable solvent, such as an aqueous solvent. A soluble composition of the desired metal or metal alloy is dissolved in the solvent. The total amount of oxygen scavenger materials can be selected to form the desired amount of coating, and the ratio of oxygen scavenger materials can be based on the stoichiometry of the coating material. The coating mixture can be heated during the coating process to reasonable temperatures, such as in the range from about 60 degrees Celsius to 100 degrees Celsius for aqueous solutions for from about 20 minutes to about 48 hours, to facilitate the coating process. After being removed from the solution, the coated electroactive material is dried and heated to temperatures generally from about 250 degrees Celsius to 600 degrees Celsius for about 20 minutes to about 48 hours to complete the formation of the coated material. The heating is optionally conducted under a nitrogen atmosphere or other substantially oxygen free atmosphere.

In yet another embodiment, the batteries described herein are lithium ion batteries generally using a non-aqueous electrolyte that comprises lithium ions. For secondary lithium ion batteries, lithium ions are released from the negative electrode during discharge such that the negative electrode functions as an anode during discharge with the generation of electrons from the oxidation of lithium upon its release from the electrode. Correspondingly, the cathode takes up lithium ions through intercalation or the like during discharge and neutralizes the lithium ions with the consumption of electrons. Upon recharging of the secondary cell, the flow of lithium ions is reversed through the cell with the negative electrode taking up lithium and with the positive electrode releasing lithium as lithium ions.

In one or more embodiments, the cathode material is provided with a relatively low risk of fire for improved safety properties due to its specific compositions as described herein. Also, these specific compositions use relatively low amounts of elements such as cobalt that are less desirable from an environmental perspective, and can be produced from starting materials that have reasonable cost for commercial scale production.

In one or more embodiments, the word "element" refers to a member of the periodic table. A metal element generally is only in a metallic state in its elemental form or a corresponding alloy of the metal's elemental form. In other words, a metal oxide or other metal composition, other than metal alloys, generally is not metallic. The dopants may also be provided in ionic form.

Without being limited to any particular theory, it is believed that when the corresponding batteries with the intercalation-based positive electrode active materials are in use, the intercalation and release of lithium ions from the lattice induces changes in the crystalline lattice of the electroactive material. As long as these changes are essentially reversible, the capacity of the material does not change. However, the capacity of the active materials is observed to decrease with cycling to varying degrees. Thus, after a number of cycles, the performance of the cell falls below acceptable values, and the cell is replaced. Also, on the first cycle of the cell, generally there is an irreversible capacity loss that is significantly greater than per cycle capacity loss at subsequent cycles. The irreversible capacity loss is the difference between the charge capacity of the new cell and the first discharge capacity. To compensate for this first cycle irreversible capacity loss, extra electroactive material is included in the negative electrode such that the cell can be fully charged even though this lost capacity is not accessible during most of the life of the cell so that negative electrode material is essentially wasted.

According to another aspect of the present invention, an electrode material is provided for use in an electrochemical device such as a battery. The electrode material can be use as an anode material or a cathode material. Embodiments described herein are related to the electrode material used as a cathode material for a lithium ion rechargeable battery. Batteries formed from these materials have been found to cycle at higher voltages and with higher capacities. It has been found that doping of the one or more of the dopant can influence the capacity, impedance and stability of the battery structures.

It has been found that appropriate coating materials can both improve the long term cycling performance of the material as well as decrease the first cycle irreversible capacity loss. While not wanting to be limited by theory, the coatings may stabilize the crystal lattice during the uptake and release of lithium ions so that irreversible changes in the crystal lattice can be reduced significantly.

In particular, the cycling properties of the batteries formed from the coated lithium metal oxide have been found to significantly improve from the uncoated material. Additionally, the overall capacity of the batteries also shows desirable properties with the coating, and the irreversible capacity loss of the first cycle of the battery is reduced. As discussed earlier, first cycle irreversible capacity loss of a battery is the difference between the charge capacity of the new battery and its first discharge capacity. The bulk of the first cycle irreversible capacity loss is generally attributed to the positive electrode material.

It has been found that the coating, optionally in collaboration with the addition of one or more dopants, provides a synergistic improvement in the performance of the cathode material described herein. In general, an elemental metal, a metal alloy, or a combination thereof, can be used for the coating. In certain instance, the dopant used as the oxygen scavenger material has the additional benefit of being reasonably cost effective and environmentally benign.

The lithium element as a dopant can be incorporated into the material at one or more selected steps in the process. For example, a lithium salt can be incorporated into the solution prior to or upon performing the precipitation step through the addition of a hydrated lithium salt. In this approach, the lithium species is incorporated into the carbonate material in the same way as the other metals. Also, due to the properties of lithium, the lithium element can be incorporated into the material in a solid state reaction without adversely affecting the resulting properties of the product composition. Thus, for example, an appropriate amount of lithium source generally as a powder, such as $LiOH.H_2O$, $LiOH$, $Li_2CO_3$, or a combination thereof, can be mixed with the precipitated metal nitrate, hydroxide or carbonate. The powder mixture is then advanced through the heating step(s) to form the oxide and then the crystalline positive electrode material.

The anode can include any material allowing lithium to be inserted in or removed from the material. Examples of such materials include carbonaceous materials, for example, non-graphitic carbon, artificial carbon, artificial graphite, natural graphite, pyrolytic carbons, cokes such as pitch coke, needle coke, petroleum coke, graphite, vitreous carbons, or a heat treated organic polymer compound obtained by carbonizing phenol resins, furan resins, or similar, carbon fibers, and activated carbon. Further, metallic lithium, lithium alloys, and an alloy or compound thereof are usable as the negative active materials.

Non-limiting examples of the non-aqueous electrolytes include an electrolytic solution based on organic solvents, and solid electrolytes such as inorganic electrolyte, polymer electrolyte, and gel-like electrolyte.

Non-limiting examples of the organic solvents include propylene carbonate (PC), ethylene carbonate (EC), diethyl carbonate (DEC), dimethyl carbonate (DMC), 1,2-dimethoxyethane, 1,2-diethoxyethane, gamma-butyrolactone, tetrahydrofuran, 2-methyl tetrahydrofuran, 1,3-dioxolane, 4-methyl-1,3-dioxolane, diethyl ether, sulfolane, methylsulfolane, acetonitrile, propionitrile, anisole, acetate, butyrate, propionate and the like.

The solid electrolyte can include an inorganic electrolyte, a polymer electrolyte and the like insofar as the material has lithium-ion conductivity. Non-limiting examples of inorganic electrolytes include lithium nitride, lithium iodide and the like. Non-limiting examples of the polymer compounds used for the polymer electrolyte include ether-based polymers such as polyethylene oxide and cross-linked polyethylene oxide, polymethacrylate ester-based polymers, acrylate-based polymers and the like. These polymers may be used singly, or in the form of a mixture or a copolymer of two kinds or more.

A matrix of the gel electrolyte may be any polymer insofar as the polymer is gelated by absorbing the above-described non-aqueous electrolytic solution. Non-limiting examples of the polymers used for the gel electrolyte include fluorocarbon polymers such as polyvinylidene fluoride (PVDF), polyvinylidene-co-hexafluoropropylene (PVDF-HFP) and the like.

The nature of the anode material may influence the resulting voltage of the battery since the voltage is the difference between the half cell potentials at the cathode and anode. The anode material can be of any suitable material known in the art. Suitable anode material can include, for example, graphite, synthetic graphite, hard carbon, mesophase carbon, appropriate carbon blacks, coke, fullerness, niobium pentoxide, intermetallic alloys, silicon alloys, tin alloys, silicon, titanium oxide, tin oxide, and lithium titanium oxide. The anode material can be combined with a polymer binder and associated with a current collector to form the anode. Similarly, other appropriate anode materials can be used to provide appropriate discharge voltages with desired cycling capability. In some embodiments, the negative electrodes can have a thickness on each side of the current collector following compression of the anode material from 5 microns to 50 microns, 25 microns to 75 microns, 65 microns to 200 microns and in further embodiments from 75 microns to 150 microns. In some embodiments, the anode has a density of from about 1.5 to 1.7 g/mL. Additional ranges of electrode thickness within the explicit ranges above are contemplated and are within the present disclosure.

In one or more embodiments, the anode and cathode materials generally are powder compositions that are held together in the corresponding electrode with a polymer binder. Without being limited to any particular theory, the binder provides ionic conductivity to the active particles when in contact with the electrolyte. Suitable polymer binders include, for example, polyvinylidine fluoride (PVDF), polyethylene oxide, polyethylene, polypropylene, polytetrafluoroethylene, polyacrylates, rubbers, e.g. ethylene-propylene-diene monomer (EPDM) rubber or styrene butadiene rubber (SBR), copolymers thereof and mixtures thereof. The polymer binders can be loaded with any suitable loading. In some embodiments, PVDF polymer binders have an average molecular weight of at least about 800,000 atomic mass units (AMU), in further embodiments at least about 850,000 AMU, in further embodiments at least about 900,000 AMU and in additional embodiments from about 1,000,000 AMU to 5,000,000 AMU. PVDF can be co-polymerized with hexafluoropropylene. Additional ranges of composition within the explicit ranges above are contemplated and are within the present disclosure. To form the electrode, the powders can be blended with the polymer in a suitable liquid, such as a solvent for the polymer. The resulting paste can be pressed into the electrode structure.

It has been found, in some embodiments, combinations of electrode materials for the cathode having two or more active material components, one having high capacity and/or specificity, the other having a relatively higher safety, can allow for lithium-ion batteries of high safety while achieving high capacity. In addition, not only are the cells safe enough and of high enough capacity for commercialization objectives, but they also exhibit significantly high cycle life. Without being limited to any theory, it is believed that the cathode material as described herein according to one or more embodiments of the present invention assists lithium to be reversibly intercalated and extracted.

In some embodiments, the dopant is a multivalent metal which is believed to provide the flexibility of multiple oxidation states and to lower structural distortions at extreme voltages. Non-limiting examples of the multivalent metal include Y, Ce, Pr, and V. Thus, the cathode material to be made by this process may be represented as $Li(Ni_{1-x}M_x)O_2$; where M is one or more additional transitional elements such as Co, Cr, Mn and Ti, or any suitable metal element having an outer sp-type electron shell. These sp elements include, for example, Al and Mg. With both cathode cost and performance considerations in mind, cathode compositions of the formula $Li[Ni_{(0.5-0.7)}Co_{(0.1-0.2)}M_{(0.1-0.4)}]O_2$ are preferred. The number of lithium atoms in the cathode material matches the total number of nickel atoms plus the dopant atoms. In one embodiment in which the cathode is a doped nickel cathode, the nickel comprises up to half or more of the metallic elements other than lithium. While cobalt enhances the electrochemical performance of the cathode, it may also increase the overall cost. In at least one embodiment, it is preferred that cobalt constitutes no more than ten to twenty percent of the non-lithium metal element content. The other dopant elements may be used as low cost stabilizers of the nickel oxide containing crystal.

EXAMPLES

FIG. 3 depicts X-ray diffraction (XRD) patterns of the exemplified cathode materials Ce-NCM ($LiNi_{0.33}Co_{0.33}Mn_{0.33}O_2$), Ce-NCA ($LiNi_{0.8}Co_{0.15}Al_{0.05}O_2$), Mg-NCA, and Sr-NCA, wherein each metal Li, Ce, Mg, or Sr is doped at 1 mole percent (%), and wherein the cathode materials are prepared by a combustion synthesis method using citric acid. The combustion synthesis can use various precursor salts such as nitrates, carbonates, and acetates as well as others. This method provides good atomic level mixing and produces homogeneous, fine powders without the need for intermediate steps. In the particular examples of Ce-NCM, an aqueous solution of $Ce(NO_3)_3 \cdot 6H_2O$ at 1 mole percent, stoichiometric amounts of $Mn(NO_3)_2 \cdot 6H_2O$, $Co(NO_3)_2 \cdot 6H_2O$, $Ni(NO_3)_2 \cdot 6H_2O$ and $LiNO_3$ at a slight excess are combined with citric acid at 5 percent in excess. The combined ingredients are gradually heated with constant stirring until combustion occurs thereby forming the desired powder. Other fuels besides citric acid can be used such as glucose, glycine, and urea. The resulting powder is then ground further and heated at 800° C. for 3 hours in air. NCA materials are heated at 800° C. for 9 hours in air. Doped NCM and NCA cathode materials can also be prepared by other synthesis methods, including solid state, sol-gel, spray pyrolysis, and co-precipitation.

The diffraction patterns as depicted in FIG. 3 suggest that mixtures of $CeO_2$ co-present with both NCM and NCA. Compared among the cathode materials tested, Ce-NCA has the most amount of $CeO_2$ indicated by the asterisk "*". Ce-NCM appears to have some $CeO_2$ as well.

Figure 4:
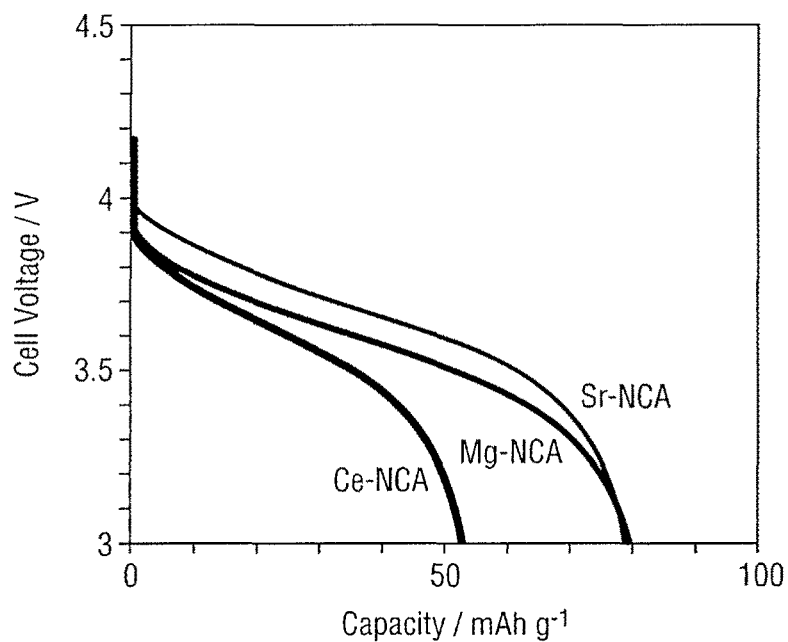
FIG. 4 depicts results of a preliminary half cell test conducted on the materials prepared according to FIG. 3.

The materials prepared according to FIG. 3 are used in a preliminary half cell testing with corresponding testing results depicted in FIG. 4. FIG. 4 depicts comparison of discharge curves of Ce-NCA, Mg-NCA, and Sr-NCA, (i=−0.5 mA/cm$^2$), in 1.2M $LiPF_6$ in EC:DMC (3:7) using a consistent electrode fabrication method, wherein discharge capacities in the order of Ce-NCA<<Mg-NCA<Sr-NCA are observed. The half-cell testing is conducted by coating the cathode materials onto an Al foil or grid current collector. The cathode material includes 5 weight percent of PVDF-HFP binder, 5 weight percent of carbon and graphite conducting additives, and 90 weight percent active materials. Different active material percent can be used to fabricate the electrode. The electrode is heated and dried in a vacuum oven at 100° C. for 6 to 48 hours, then assembled into a cell with lithium counter and reference electrodes and Celgard 2400 separators. With the electrolytic solution, the half cell, having about 1 cm2 active area, is applied a constant current density of +/−50 mA/g to charge and discharge the half cell. Voltage is monitored with the time of current application. Cutoff voltage is defined as 4.2 to 3 volts.

Figure 4A:
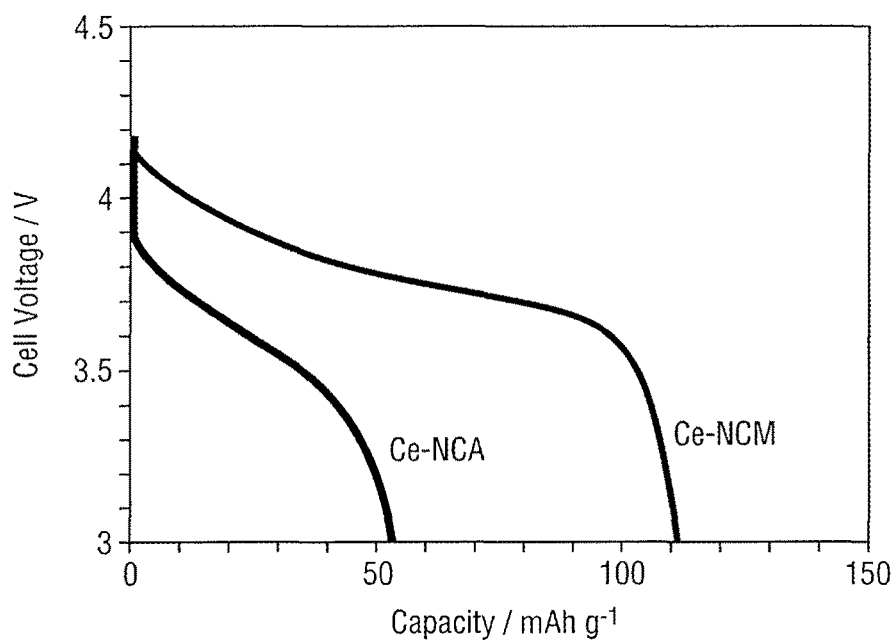
FIG. 4a depicts Ce-NCM having notably higher discharge capacity relative to Ce-NCA as described in relation to FIG. 3.

FIG. 4a, shown as an inset of FIG. 4, depicts Ce-NCM having notably higher discharge capacity relative to Ce-NCA. This example illustratively shows some particular benefits of cerium doping. Without being limited to any particular theory, it is appreciated that cerium doping provides a possible oxygen storage/scavenging capability to mitigate one of the thermal runaway steps, for instance at steps involving cathode oxygen generation at 220° C. or greater.

Figure 5:
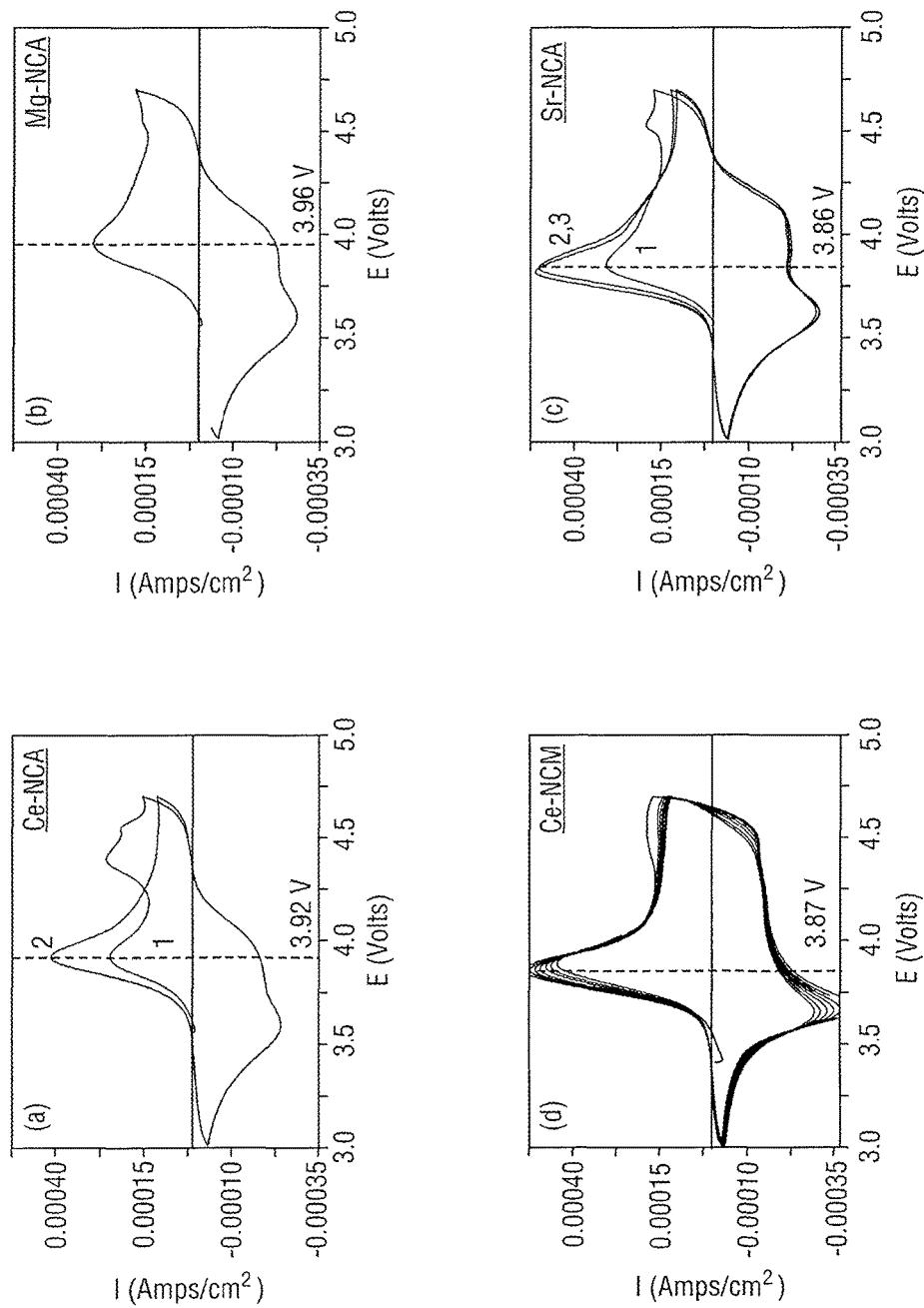
FIG. 5 depicts a low rate voltammetric scan (0.01 mV/s) up to +4.7 V of the four materials described in relation to FIG. 3.

FIG. 5 depicts a low rate voltammetric scan (0.01 mV/s) up to +4.7 V of the four materials described in relation to FIG. 3. FIG. 5 depicts a comparative view of cyclic voltammetric responses of Ce-NCA, Mg-NCA, Ce-NCM, and Sr-NCA, wherein two-electrode cell is used in 1.2M $LiPF_6$ in EC:DMC (3:7) with scan rate 0.01 mV/s with lithium metal as counter and reference electrode. Voltage is initially swept forward between +4.7 V to 3.0 V. For both Ce- and Sr-doped NCA electrodes, a small irreversible oxidation peak at 4.4~4.6 V are observed during first scan only. Main oxidation peak (3.8~3.92V) is found to increase on the following scans. Also depicted in FIG. 5 is a peak increase upon subsequent scans.

In FIG. 5, the voltage is applied and the responding current is measured. The figure represents a typical cyclic voltammogram in which the current response is plotted with respect to voltage applied. The voltage cycling is repeated. Numbers 1, 2, 3 represent the first, second, and third cycle sweeps. Increased peak height in cycle 2 and 3 suggest that the lithium extraction and re-insertion tend to improve with subsequent cycles. Without being limited to any particular theory, it is appreciated that the doped cathode materials may provide relatively higher structure stability at certain voltages possibly by improving $Li^+$ extraction.

Figure 6:
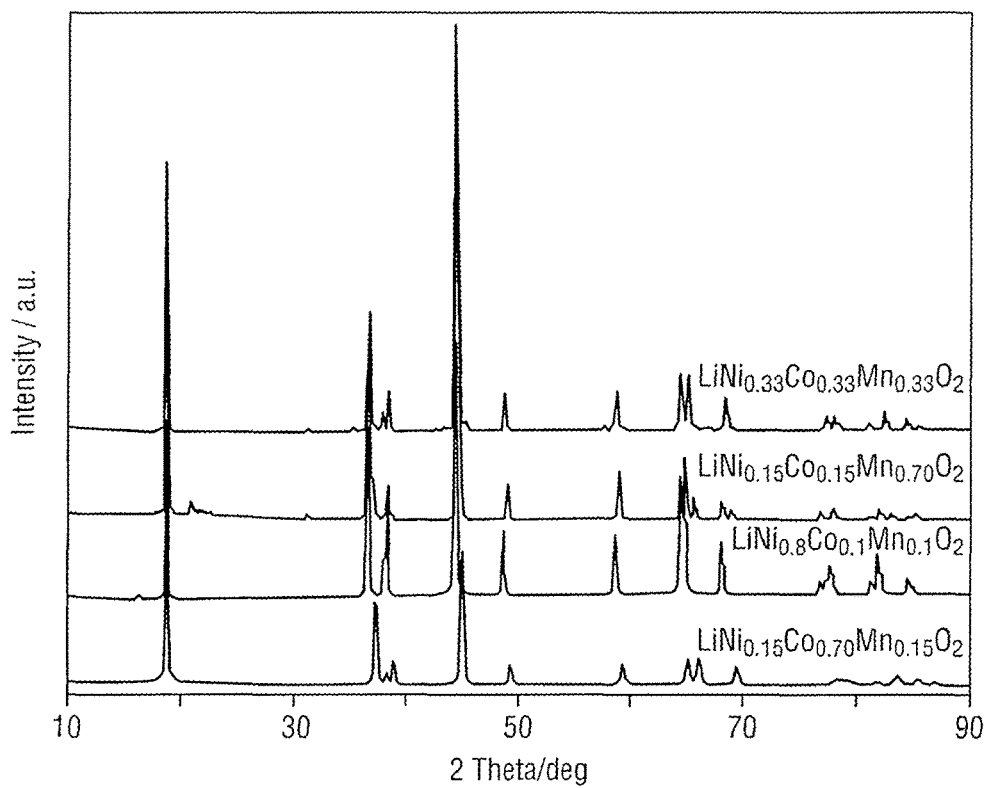
FIGS. 6 and 7 depict results of a structural study conducted on several different materials having the general formula of $LiNi_xCo_yMn_zO_2$ with variable values in x, y, and z, according to one or more embodiments of the present invention.
Figure 7:
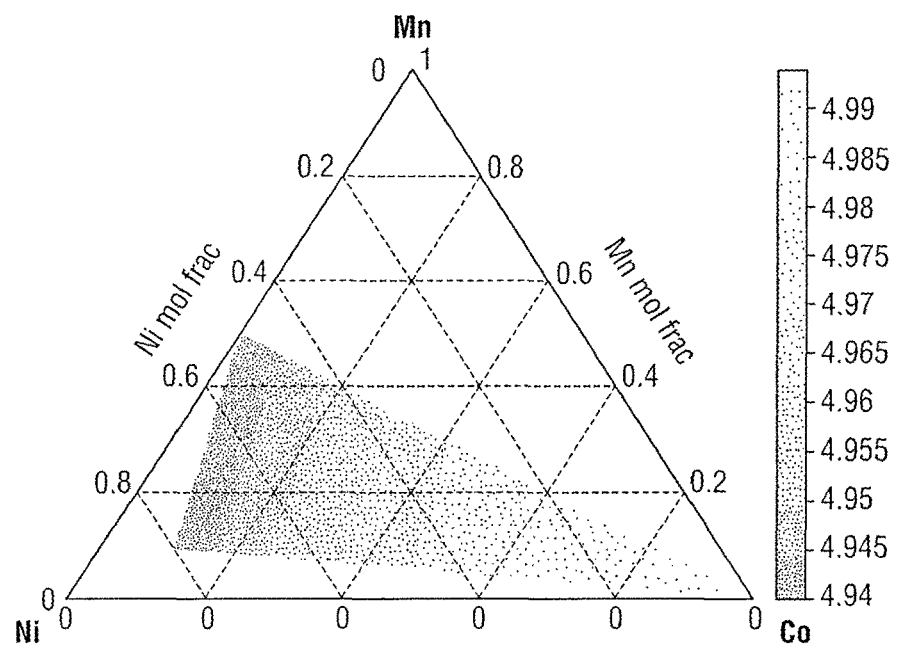

FIGS. 6 and 7 depict results of a structural study conducted on several different materials having the general formula of $LiNi_xCo_yMn_zO_2$ with variable values in x, y, and z. XRD patterns of $LiNi_{0.15}Co_{0.70}Mn_{0.15}O_2$, $LiNi_{0.8}Co_{0.10}Mn_{0.1}O_2$, $LiNi_{0.33}Co_{0.33}Mn_{0.33}O_2$ are consistent with the hexagonal (R-3m) structure and are fitted to obtain the c/a ratios summarized in FIG. 7. The c/a ratio refers to the hexagonal lattice parameters of the cathode material obtained from X-ray diffraction measurement. As the cathode materials according to one or more embodiments of the present invention are typically hexagonal, the c/a reflects the "stubbornness" of the hexagonal structure. Exemplified c/a values of lithiated NCM oxides range from 4.92 to 4.98.

Figure 8:
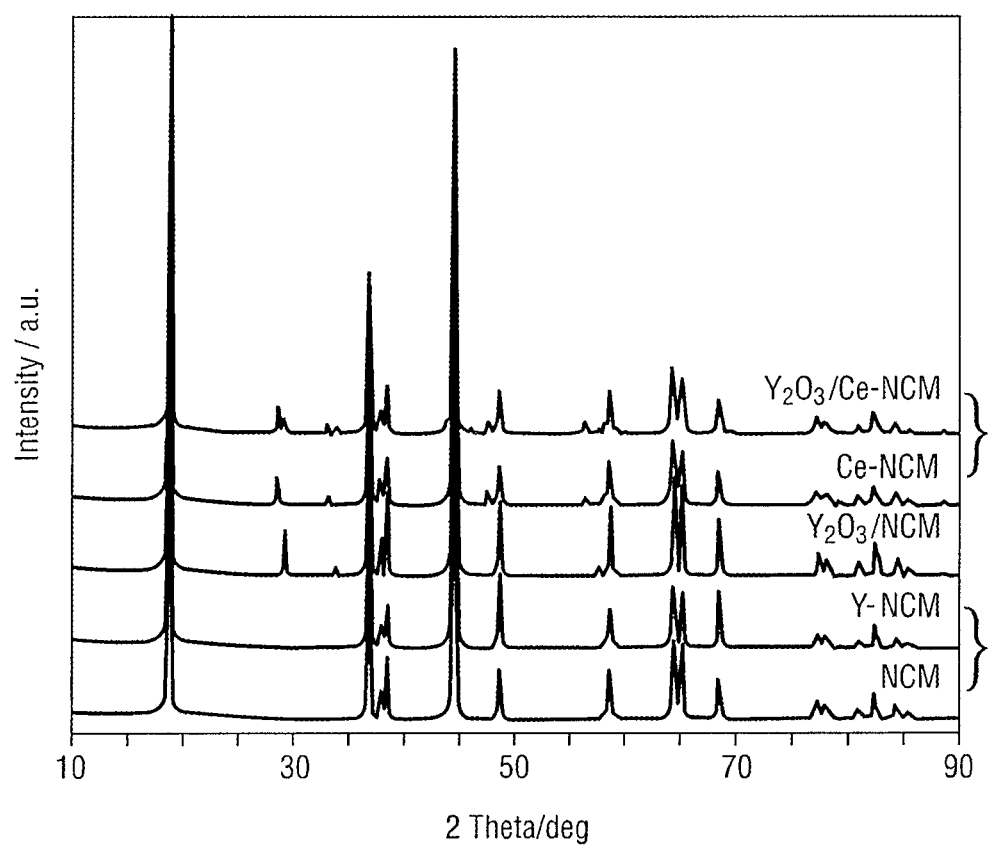
FIG. 8 depicts XRD patterns of $LiNi_{0.33}Co_{0.33}Mn_{0.33}O_2$ which has been doped with Cr or Y and coated with $Y_2O_3$ or $ZrO_2$ for durability and thermal stability improvement, according to one or more embodiments of the present invention.

FIG. 8 depicts XRD patterns of $LiNi_{0.33}Co_{0.33}Mn_{0.33}O_2$ which has been subjected to transitional metal doping with Cr or Y and oxide coating with $Y_2O_3$ or $ZrO_2$ for durability and thermal stability improvement. Prepared by the method of combustion synthesis, the materials include Y-NCM, $Y_2O_3$ coated Ce-NCM, and $ZrO_2$ coated Ce-NCM. A preliminary charge/discharge testing of the Y-doped NCM extended up to a 5V charge cutoff shows that the doped material is provided with relatively higher robustness relative to baseline NCM that has not been doped.

While the best mode for carrying out the invention has been described in detail, those familiar with the art to which this invention relates will recognize various alternative designs and embodiments for practicing the invention as defined by the following claims.

What is claimed:

1. An electrode material comprising:
    a Li-containing oxide of the formula of $Li(Ni_xCo_yM_z)O_2$, wherein M is an element different from Li, Ni, Co, or O, wherein x, y, and z are each independently between 0 and 1, and the sum of x, y, and z is 1;
    an oxygen scavenger oxide, including at least one of $Y_2O_3$, $CeO_2$, and CeO, contacting the Li-containing oxide; and
    a dopant intermixed with the Li-containing oxide and including Ce.

2. The electrode material of claim 1, wherein M is selected from the group consisting of Al, Mn, Cr, Fe and combinations thereof.

3. The electrode material of claim 1, wherein y is between 0 and ⅓.

4. The electrode material of claim 1, wherein at least one of x and z is no less than ⅓.

5. The electrode material of claim 1, wherein the Li-containing oxide is selected from the group consisting of $Li(Ni_xCo_yAl_z)O_2$, $Li(Ni_xCo_yMn_z)O_2$, $Li(Ni_xCo_yAl_{za}Mn_{zb})O_2$, and combinations thereof, wherein za and zb are each a non-zero value and the sum of za and zb equals z.

6. The electrode material of claim 1, wherein the dopant further includes at least one of Cr, Zr, Sr, Y, La, Mg, Pr and V.

7. The electrode material of claim 1, wherein the dopant further includes Zr.

8. The electrode material of claim 1, wherein the Li-containing oxide is selected from the group consisting of $Li(Ni_xCo_yAl_z)O_2$ including Sr as a dopant, $Li(Ni_xCo_yAl_z)O_2$ including Mg as a dopant, $Li(Ni_xCo_yAl_z)O_2$ including Ce as a dopant, $Li(Ni_xCo_yMn_z)O_2$ including Ce as a dopant, and combinations thereof.

9. The electrode material of claim 1, wherein a molar ratio between the dopant relative to the Li-containing oxide is from 0.001 to 0.1.

10. The electrode material of claim 1, further comprising a second Li-containing oxide configured as a second oxide material layer disposed next to the existing oxide composite as a first material layer, and further comprising a current collector configured such that the first material layer is disposed between the current collector and the second oxide material layer.

11. The electrode material of claim 10, wherein the second Li-containing oxide has the formula of $Li(Ni_{x2}Co_{y2}M_{z2})O_2$, wherein M is an element different from Li, Ni, Co, or O, wherein x2, y2, and z2 are each independently between 0 and 1, and the sum of x2, y2, and z2 is 1.

12. The electrode material of claim 1, wherein the dopant further includes Pr.

13. The electrode material of claim 1, wherein the dopant further includes at least one of Sr, Y, and Pr.

14. An electrochemical cell system comprising:
    a cathode material including a first material layer and a second material layer disposed next to the first material layer, the first and the second material layers each independently including a Li-containing oxide of the formula of $Li(Ni_xCo_yM_z)O_2$, wherein M is an element different from Li, Ni, Co, or O, wherein x, y, and z are each independently between 0 and 1 and the sum of x, y, and z is 1, and wherein the first and second material layers differ from each other in at least one of the values for x, y, and z and the composition for M, the first material layer further including an oxygen scavenger oxide contacting the Li-containing oxide, and the Li-containing oxide of the first material layer further comprising a dopant intermixed with the Li-containing oxide and including Ce; and
    a current collector in electronic communication with the cathode material, the current collector being disposed adjacent to the first material layer and spaced apart from the second material layer.

15. The electrochemical cell system of claim 14, wherein the dopant further includes at least one of Cr, Zr, Sr, Y, La, Mg, Pr and V.

16. The electrochemical cell system of claim 15, a molar ratio between the dopant relative to the Li-containing oxide is from 0.001 to 0.1.

17. The electrode material of claim 14, wherein the oxygen scavenger oxide includes at least CeO.

18. The electrode material of claim 14, wherein the dopant further includes Pr.

19. An electrode material comprising:
    a Li-containing oxide of formula $Li(Ni_xCo_yM_z)O_2$, wherein M is an element different from Li, Ni, Co, or O, wherein x, y, and z are each independently between 0 and 1, and the sum of x, y, and z is 1;
    a dopant, including Ce and Pr, intermixed with the Li-containing oxide; and
    an oxygen scavenger oxide, including at least one of $ZrO_2$, $Y_2O_3$, CeO, $CeO_2$ and $TiO2$, contacting the Li-containing oxide.

20. The electrode material of claim 19, wherein the oxygen scavenger material includes at least one of $ZrO_2$, $Y_2O_3$, $CeO_2$, CeO and $TiO_2$.

* * * * *